Figure 1:
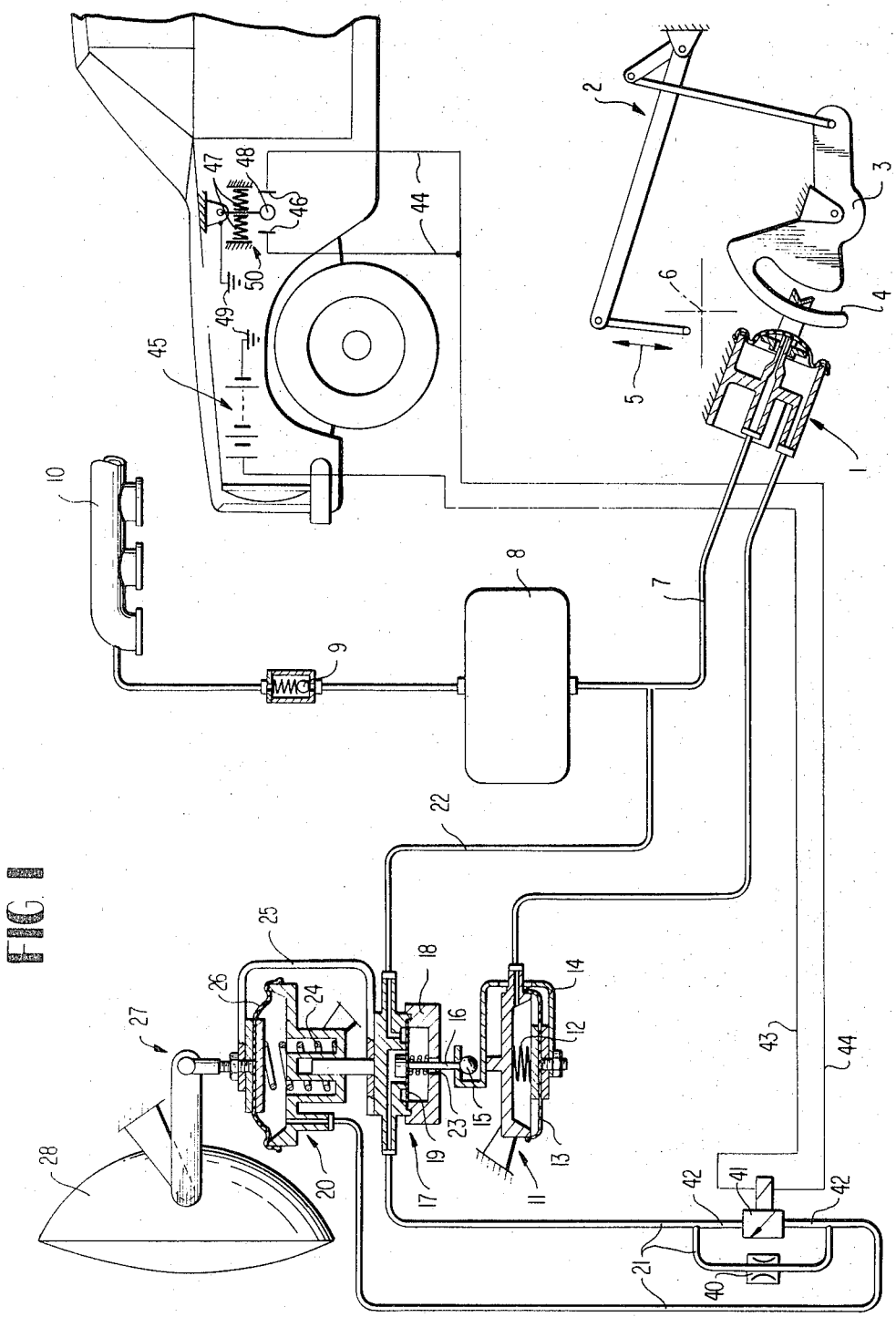

United States Patent [19]

Andres et al.

[11] 3,840,730

[45] Oct. 8, 1974

[54] PNEUMATICALLY OPERATING CONTROL SYSTEM FOR AUTOMATIC ALIGNMENT OF MOTOR VEHICLE HEADLIGHTS

[75] Inventors: Rudolf Andres, Sindelfingen; Hermann Möller, Aidlingen; Franz Seyfried, Sindelfingen, all of Germany

[73] Assignee: Daimler-Benz Aktiengesellschaft, Stuttgart, Germany

[22] Filed: Oct. 2, 1972

[21] Appl. No.: 294,181

[30] Foreign Application Priority Data
Oct. 2, 1971 Germany.......................... 2149267

[52] U.S. Cl............................. 240/7.1 LJ, 240/62.3
[51] Int. Cl............................................. B60q 1/10
[58] Field of Search.................... 240/62.3, 7.1 LJ

[56] References Cited
UNITED STATES PATENTS
3,596,837  8/1971  Todd ............................ 240/7.1 LJ
FOREIGN PATENTS OR APPLICATIONS
1,506,590  12/1967  France............................ 240/62.3

Primary Examiner—Samuel S. Matthews
Assistant Examiner—Russell E. Adams, Jr.
Attorney, Agent, or Firm—Craig & Antonelli

[57] ABSTRACT

A pneumatically operating control system for the automatic alignment of motor vehicle headlights which includes control elements coordinated to one or both axles of the motor vehicle which align the motor vehicle headlights to a constant light range as a function of the change of the distance of the respective axle with respect to the body of the motor vehicle by way of adjusting motors and a control shifting device; a preferably electrically actuated displacement valve is arranged in a connecting line between a control shifting device and an adjusting motor which, during braking and accelerating operations, eliminates the throttling effect of the connecting line, triggered by at least one switch, and leads to a rapid equalization of the change in angular value between the optical axis of the headlight and the road surface.

18 Claims, 2 Drawing Figures

PNEUMATICALLY OPERATING CONTROL SYSTEM FOR AUTOMATIC ALIGNMENT OF MOTOR VEHICLE HEADLIGHTS

The present invention relates to a pneumatically operating control installation for the automatic alignment of motor vehicle headlights, consisting of control elements coordinated to one or both axles of the motor vehicle, which align the motor vehicle headlights to constant light distance in dependence on the change of the distance of the respective axle to the body of the motor vehicle by way of adjusting motors and a control shifting device, whereby the control installation is fed with vacuum, as disclosed in the copending application Ser. No. 195,984, filed on Nov. 5, 1971, and assigned to the assignee of the instant application, the subject matter of which is incorporated herein by reference to the extent necessary.

It has already been pointed out in the aforementioned copending application that by an appropriate matching of all line cross sections, the damping in the lines can be so selected that also during braking and acceleration operations, the headlight position can be corrected whereas the control installation does not respond at a higher frequency of the deflections—as occurs, for example, when driving on poor roads.

It has been discovered that in many instances the constant throttling effect of the lines leads to an undesirable inertia characteristic. In particular, during emergency braking operations and during kick-down, the necessary rapid adaptation of the headlight position cannot be attained.

It is the aim of the present invention to avoid the aforementioned disadvantage and to provide an installation which in particular during braking and acceleration operations leads to an instantaneous light range or light distance adaptation of the motor vehicle headlights.

Accordingly, it is proposed in accordance with the present invention to arrange a preferably electrically actuated displacement valve in a connecting line between the control shifting device and an adjusting motor, which eliminates the throttling effect of the connecting line during braking and accelerating operations--triggered or initiated by at least one switch- —and which leads to a rapid equalization of the change of the angular value between the optical axis of the headlights and the road surface.

In one advantageous embodiment of the present invention, a pendulum damped by springs and connected with the vehicle mass serves as switch, which in its rest position is suspended at a distance between two parallelly connected contacts, of which an electric line leads to a connection of the electrically actuated displacement valve which is connected by way of a further line with the positive terminal of the vehicle battery.

In another embodiment of the present invention, two parallelly disposed switches are provided for the actuation of the displacement valve, of which one switch responding to acceleration operations is constructed as mercury switch and in which the switch responding to braking operations serves simultaneously as brake light switch.

Accordingly, it is an object of the present invention to provide a pneumatically operating control system for the automatic alignment of motor vehicle headlights which avoids by simple means the aforementioned shortcomings and drawbacks encountered in the prior art.

Another object of the present invention resides in a pneumatically operating control installation for the automatic alignment of motor vehicle headlights which avoids undesirable inertia characteristics in the system.

A further object of the present invention resides in a control system of the type described above which is able to align the headlights of the motor vehicle rapidly also during emergency braking and when accelerating the vehicle, without responding to high-frequency variations as occur, for example, when driving on poor roads.

Figure 2:
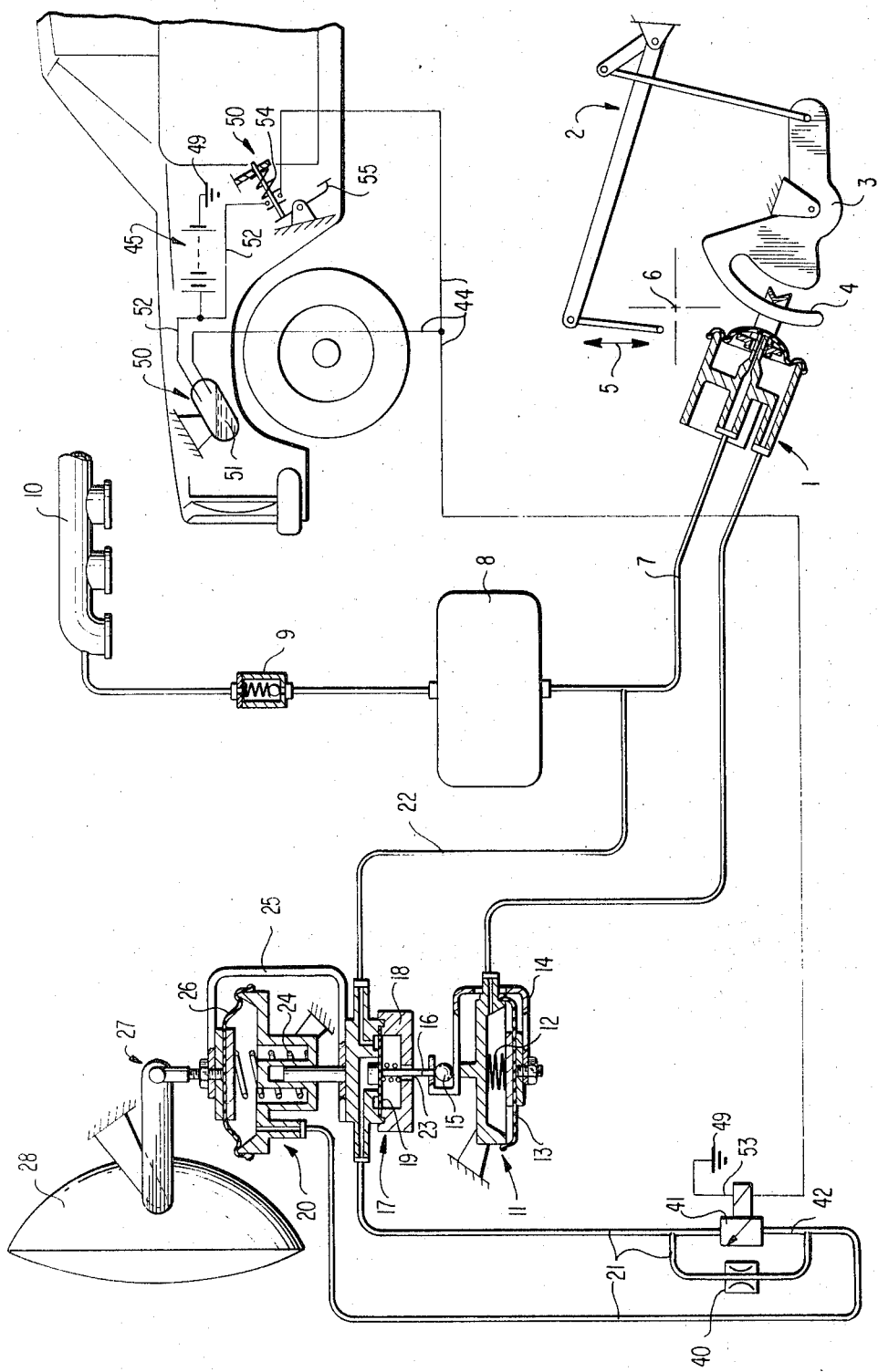

These and further objects, features and advantages of the present invention will become more apparent from the following description when taken in connection with the accompanying drawing which shows, for purposes of illustration only, two embodiments in accordance with the present invention, and wherein:

FIG. 1 is a somewhat schematic view, partly in cross section, of a first embodiment of a control installation for the automatic alignment of the motor vehicle headlights in accordance with the present invention in which a pendulum serves as triggering element for eliminating the throttling effect; and FIG. 2 is a somewhat schematic view, partially in cross section, of a second embodiment of a control installation for the automatic alignment of the motor vehicle headlights in accordance with the present invention in which the elimination of the throttling effect is obtained by means of a mercury switch and the brake light switch.

Referring now to the drawing wherein like reference numerals are used throughout the two views to designate like parts, a pressure modulator generally designated by reference numeral 1 is secured in both figures at the body of a motor vehicle. The pressure modulator 1 detects the vertical movements 5 of the rear axle 6 by way of a linkage generally designated by reference numeral 2 and by way of a control cam 4 arranged at a lever 3. The pressure modulator 1 is connected with a suction pipe 10 of the internal combustion engine (not shown) by way of a line 7 which includes a reservoir tank 8 and a check valve 9. An adjusting motor generally designated by reference numeral 11 is acted upon against the force of a spring 12 by means of the vacuum modulated by the pressure modulator 1 in dependence on the position of the body with respect to the rear axle 6, whereas its diaphragm 13 is connected with a mushroom piston 16 of a control shifting or switching device generally designated by reference numeral 17 by way of an angularly bent rod 14 extended about the adjusting motor 11 and by way of a ball joint 15. The control shifting device 17 has such a construction that the mushroom piston 16 displaceably arranged in a flat cylindrical housing 18 so acts on a diaphragm 19 of the control shifting device 17 depending on the movement of the diaphragm 13 that either a preferably flexible line 21 is connected with an also preferably flexible line 22 branching off from the line 7, or that the line 21 is in communication with the atmospheric air by way of an aperture 23 in the bottom of the housing 18, which simultaneously accommodates the mushroom piston 16 with play.

The vacuum which builds up in a second adjusting motor generally designated by reference numeral 20 acts on a diaphragm 26 which is retracted or pulled in against the force of a spring 24 in the presence of the vacuum. An angularly bent adjusting rod 25 extended about the adjusting motor 20 is connected at one end with the diaphragm 26 of the adjusting motor 20 and at the other end with the housing 18 of the control shifting device 17. An adjusting linkage generally designated by reference numeral 27 for the change of the position of the headlights adjoins the diaphragm 26.

The construction described so far corresponds to one of the two embodiments according to the aforementioned co-pending application. However, it is also possible within the scope of the present invention to utilize in lieu of only a single pressure modulator also two pressure modulators, of which one could be coordinated to the rear axle and the other to the front axle.

Complementing the embodiment described so far, in FIG. 1, there is illustrated in the line 21 connecting the control shifting device 17 with the adjusting motor 20 a throttle 40 as symbol for the inherent throttling effect of this line which can be by-passed by an electrically actuated displacement valve 41 which is inserted into a line 42 branching off from the line 21 and connected in parallel thereto. Electric lines 43 and 44 starting from the displacement valve 41 lead, on the one hand, to the positive terminal of a motor vehicle battery 45 (not illustrated in detail) and, on the other, to two parallelly connected contacts 46. A pivotally suspended pendulum 48 damped by means of springs 47, which is operatively connected with the vehicle ground 49 represents the triggering element of a switch generally designated by reference numeral 50 which comes into abutment at the respectively associated contact 46 during braking and acceleration operations and leads to an initiation of the through-passage position of the displacement valve 41.

In FIG. 2, two switches generally designated by reference numeral 50 are provided of which one is constructed as mercury switch 51 and responds during acceleration operations whereby an electric connection to the displacement valve 41 is established by way of a line branch 52 coming from the positive terminal of the vehicle battery 45 and by way of a line 44; the displacement valve 41 is also connected with the vehicle ground 49 by way of a line 53. The second switch 50 serves simultaneously as brake-light switch 54 and is actuated by means of the brake pedal 55.

In both embodiments, the response time of the adjusting installation is considerably decreased during braking and accelerating operations whereby care must be taken that a triggering of the switch 50 does not take place in case of occurring ground unevenesses. This can be readily achieved by conventional means, known as such in the art, and therefore not described in detail herein.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. In a control installation for the automatic and continuous alignment of motor vehicle headlights, said control installation being of the type having at least one adjusting motor means and control shifting means for aligning the motor vehicle headlights in response to control means for detecting a change of distance between at least one axle in a motor vehicle and the body of the motor vehicle, said adjusting motor means and said control shifing means being connected by a connecting line, the improvement comprising means for eliminating throttling effects in said connecting line during braking and acceleration operations of the motor vehicle, said means for eliminating being connected in said connecting line between said adjusting motor means and said control shifting means.

2. A control installation according to claim 1, characterized in that the control means are coordinated to both axles.

3. A control installation according to claim 1, characterized in that the control installation is pneumatically operated.

4. A control installation according to claim 3, characterized in that the control installation is fed with a vacuum.

5. A control installation according to claim 4, characterized in that the vacuum is obtained from the suction pipe of an internal combustion engine.

6. A control installation according to claim 1, wherein said means for eliminating throttling effects include valve means.

7. A control installation according to claim 6, wherein the control installation is pneumatically operated.

8. A control installation according to claim 7, wherein the control installation is fed with a vacuum.

9. A control installation according to claim 8, characterized in that the valve means is a displacement valve which is electrically actuated.

10. A control installation according to claim 9, further characterized by at least one switch means for initiating the operation of the valve means.

11. A control installation according to claim 10, characterized in that a pendulum means damped by springs and operatively connected with vehicle ground serves as said switch means, said pendulum means being suspended in its normal position at a distance between two parallelly connected contacts, from which an electric line leads to a connection of the electrically actuated displacement valve means which is connected by way of a further line with the positive terminal of a vehicle battery.

12. A control installation according to claim 10, characterized in that two parallelly disposed switch means are provided for the actuation of the displacement valve means, of which the switch means responding to accelerating operations is constructed as a mercury switch and of which the switch means responding to braking operations serves simultaneously as a brake light switch.

13. A control installation according to claim 6, further characterized by at least one switch means for initiating the operation of the valve means, said valve means being electrically actuated by said switch means.

14. A control installation according to claim 10, characterized in that the control means are coordinated to both axles.

15. A control installation according to claim 13, characterized in that the valve means is a displacement valve which is electrically actuated.

16. A control installation for the automatic alignment of motor vehicle headlights, which includes control means coordinated to at least one axle of the motor vehicle which align the motor vehicle headlights to a constant light distance in dependence on the change of the distance of the respective axle to the body of a motor vehicle by way of adjusting motor means and control shifting means, characterized in that a valve means is arranged in a connecting line between a control shifting means and an adjusting motor means, said valve means being operable during braking and acceleration operations to eliminate the throttling effect in the connecting line and to lead to a rapid equalization of the change of angular value between the optical axis of the headlights and the road surface, further characterized by at least one switch means for initiating the operation of the valve means, and characterized in that a pendulum means damped by springs and operatively connected with vehicle ground serves as switch means, said pendulum means being suspended in its normal position at a distance between two parallelly connected contacts, from which an electric line leads to a connection of the valve means which is connected by way of a further line with the positive terminal of a vehicle battery.

17. A control installation for the automatic alignment of motor vehicle headlights, which includes control means coordinated to at least one axle of the motor vehicle which align the motor vehicle headlights to a constant light distance in dependence on the change of the distance of the respective axle to the body of a motor vehicle by way of adjusting motor means and control shifting means, characterized in that a valve means is arranged in a connecting line between a control shifting means and an adjusting motor means, said valve means being operable during braking and acceleration operations to eliminate the throttling effect in the connecting line and to lead to a rapid equalization of the change of angular value between the optical axis of the headlights and the road surface, further characterized by at least one switch means for actuating the operation of the valve means, and characterized in that two parallelly disposed switch means are provided for the actuation of the valve means, of which the switch means responding to accelerating operations is constructed as mercury switch and of which the switch means responding to braking operations serves simultaneously as brake light switch.

18. A control installation for automatically aligning motor vehicle headlights on motor vehicles of the type having axles and a superstructure which is relatively movable with respect to at least one of said axles; said installation comprising:

first adjusting motor means actuable in response to supply of a pressure medium to said first motor means, first interconnecting means for interconnecting said first motor means to said headlights such that actuation of said first motor means effects changes in the inclination of said headlights with respect to the superstructure, first circuit means for substantially continuously supplying a pressure medium during operation of said vehicle, control valve means movable between a first control valve position for communicating said first motor means with said pressure medium in said first circuit means to actuate said first motor means and a second control valve position for communicating said first motor means with other than said pressure medium, said control valve means including second circuit means for supplying said pressure medium to said first motor means, control installation means for automatically and continuously controlling the movement of said control valve means in response to relative changes in position of at least one of said axles with respect to said superstructure, and second valve means for eliminating throttling effects in said second circuit means during braking and acceleration operations of the motor vehicle, said second valve means being connected in said second circuit between said first motor means and said control valve means.

* * * * *